Oct. 5, 1954
T. D. SHARPLES
2,690,967
PHOTOGRAPHIC STENCIL SCREEN AND
METHOD OF MAKING THE SAME
Original Filed Oct. 24, 1944
FIG. 1
FIG. 2
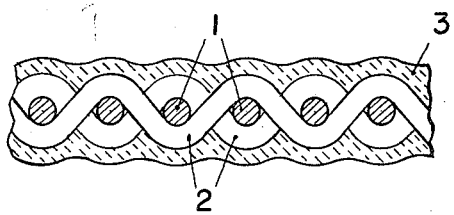
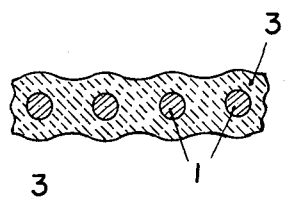
FIG. 3
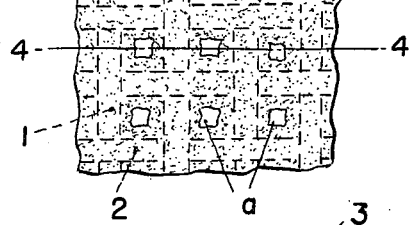
FIG. 4
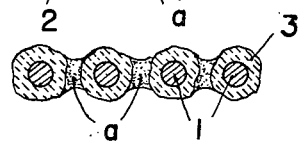
FIG. 5
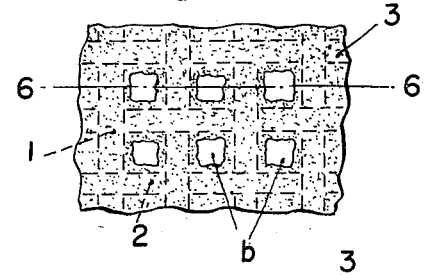
FIG. 6
FIG. 7
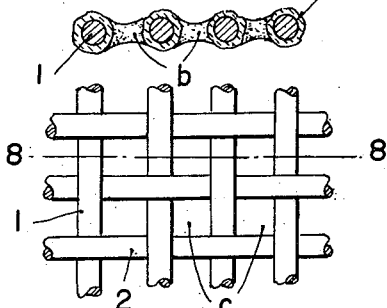
FIG. 8
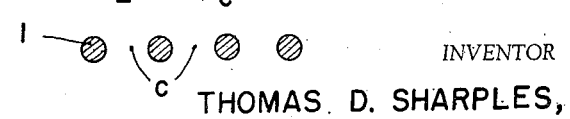
INVENTOR
THOMAS D. SHARPLES,
BY *Hugo A. Kenman*
ATTORNEY Patented Oct. 5, 1954

2,690,967

UNITED STATES PATENT OFFICE 2,690,967

PHOTOGRAPHIC STENCIL SCREEN AND METHOD OF MAKING THE SAME

Thomas D. Sharples, Schwenksville, Pa., assignor to The Sharples Corporation, a corporation of Delaware Original application October 24, 1944, Serial No. 560,157, now Patent No. 2,500,877, dated March 14, 1950. Divided and this application February 28, 1950, Serial No. 146,792

4 Claims. (Cl. 95—8)

This invention relates to stencil screens and more particularly to photographic screens for half-tone printing.

It has long been common to reproduce line subjects photographically by means of stencil screens made of textile fabrics. The usual method is to photograph the line subject and prepare a diapositive from the negative so obtained. The screen is sensitized by coating with bichromated gelatin solution and allowed to dry. This is sensitive to light and will become insoluble by exposure to light of the violet end of the spectrum. Accordingly, the sensitized screen is exposed to light, behind the line diapositive and, after sufficient exposure to insure thorough insolubilization of the exposed sensitive material the screen is treated with hot water. The gelatin not exposed to light, being soluble in hot water, will dissolve, whereas that exposed to light will not dissolve. It is therefore clear that wherever the diapositive carried a line there will be a line on the screen, consisting of open pores or meshes in the fabric.

Attempts have heretofore been made to reproduce half-tone subjects by means of photographically prepared fabric screen stencils, but serious difficulties have been encountered. These prior attempts have involved the use of a half-tone diapositive, prepared by means of the well known photoengraver's half-tone screen. One difficulty is that it is necessary for the dots of the half-tone screen to be of much coarser grade than the mesh of the fabric screen. A second difficulty also arises, namely that when the two screens are superposed a moire effect is often produced, due to interference between the patterns.

The object of the present invention is to provide a new method for producing line and half-tone screen stencils directly from line or continuous tone transparencies without recourse to the half-tone screen or to the special half-tone camera and plate holders of the photoengraver. With my improved method the difficulties due to moire effect are entirely eliminated and the resulting half-tone reproduction is of exactly the same grade or texture as the mesh of the fabric screen itself.

A further object of the invention is to provide an improved method whereby the above results can be obtained with a minimum of equipment and with relatively simple processing, so that the practice of the invention lies well within the abilities and equipment of the usual commercial photographer.

The present application is a division of my copending application Serial Number 560,157, filed October 24, 1944, now Patent No. 2,500,877, issued March 14, 1950. While said application covers the complete stencil screen for half-tone printing, and method of making the same, the present application is directed to the prepared textile fabric from which such stencil screens can be produced by photographic processes.

While my improved half-tone stencil screen can be prepared from either a positive or negative transparency, the use of a positive transparency or so-called diapositive is somewhat simpler.

In preparing my improved stencil screen, according to one form of the invention, I employ as a base a piece of woven fabric of suitable fineness made from such materials as cellulose nitrate, regenerated cellulose (rayon), cellulose acetate, hard gelatin, or other synthetic or natural fibers. The material employed should be such that the fibers thereof tend to absorb water or swell in water or absorb and swell in such aqueous solutions as it may be found desirable to use in connection with this process.

The warp and weft strands or filaments of which the textile fabric is woven have incorporated in them light-sensitive silver salts, such as silver halide salts. These silver salts may be incorporated into the strands or filaments either during the process of manufacture, or by subsequent treatment.

The above mentioned woven textile fabric in the strands of which a light-sensitive silver salt is incorporated is then thoroughly impregnated with suitable gelatinous material free from silver salts. A suitable material is medium hard gelatin, relatively insoluble in water below 35° C. and relatively soluble in water above 45° C.

The sheet of fabric thus treated, after having been dried, is exposed to light of suitable wave length through a photographic diapositive, either by contactor or by projection, so that the silver salts exposed to light passing through said diapositive become developable and the portions not exposed to light remain undevelopable. After exposure, the sheet is treated in a suitable developing solution of such a nature that the silver salts which are more or less exposed to light become more or less reduced to metallic colloidal silver. After development, the sheet is washed to remove the developing chemicals and soluble reaction products.

The sheet is then treated with a special hardening and bleaching solution so that the gelatin becomes more or less insoluble in hot water, according to the amount of silver present in the fibers or strands. The sheet is then subjected to the action of hot water in order to remove all of the water soluble gelatin, while leaving unaffected the portion of gelatin rendered insoluble by the above mentioned bleaching and hardening solution. The screen is then dried and is ready for use.

As a result of the above described process the gelatin surrounding each strand of the fabric is rendered insoluble to a greater or lesser distance from the strand in accordance with the amount of silver present in that particular strand, so that, after the soluble portions have been washed away, there remains a coating of greater or less thickness around each strand. Hence, in certain areas openings will be formed between the coated strands, these openings being small where the coating is thick, and being larger where the coating is thinner. In some places, where the gelatin has been completely washed away, the openings are of the full size of the mesh of the fabric. There is thus produced a half-tone stencil screen having openings which form the dots in the printed reproduction, such openings lying within the meshes of the fabric between the strands thereof and being larger or smaller in accordance with the depth of tone present in various areas of the original diapositive.

In order that the invention may be readily understood, reference is had to the accompanying drawing forming part of this specification and in which:

Fig. 1 is a fragmentary transverse section through a sheet of textile fabric impregnated and coated in accordance with the invention.

Fig. 2 is a diagrammatic section through a portion of the finished screen which has been most heavily exposed to light, the warp threads being omitted for the sake of clearness.

Figs. 3, 5 and 7 are fragmentary plan views showing the appearance of different areas of the finished screen, these areas representing a high light portion, a middle tone portion and a dark shadow portion of the picture, respectively, and Figs. 4, 6 and 8 are views similar to Fig. 2, being sections substantially on the lines 4—4 of Fig. 3, 6—6 of Fig. 5, and 8—8 of Fig. 7, respectively, the warp threads being omitted for the sake of clearness.

Referring to the drawing in detail, my improved screen comprises a piece of woven textile fabric formed of the usual weft threads or strands 1, and the warp threads or strands 2. In these threads have been incorporated light-sensitive silver salts, and the fabric is impregnated and coated with gelatin 3, as above described in such manner that the gelatin overlies the silver salts and completely fills the openings between the threads or strands, as shown in Fig. 1.

After this sheet has been exposed to light through a photographic transparency, developed, hardened and subjected to washing in hot water, as described, it will contain some portions, corresponding to the extreme high lights of the picture, in which the gelatin has been rendered entirely insoluble and hence none of it has been removed by the hot water bath. Such a portion is illustrated in Fig. 2, and it will be seen that the meshes of the fabric are entirely blocked so that no ink whatever can pass through, during the printing operation.

In other areas of the screen, corresponding to the medium high lights of the picture, somewhat less silver has been produced and consequently certain portions of the gelatin remained soluble and have been removed by the hot water bath. Thus the gelatin which is insoluble and which remains in the screen is in the form of a coating around each individual strand. The depth or thickness of this coating is such that small openings or interstices $a$ are formed in the mesh of the fabric between the coated strands, as shown in Figs. 3 and 4.

In other areas of the screen, corresponding to the middle tones of the picture, still less silver has been produced within the strands, and consequently a greater amount of the gelatin remained soluble and has been dissolved by the hot water bath. As a result, the coating remaining around each strand is thinner, and consequently larger openings $b$ are formed between the coated strands, as shown in Figs. 5 and 6.

In still other areas of the screen, corresponding to the dark tones or shadows of the picture, practically no light has reached the screen during the exposure through the transparency and consequently practically no silver has been produced in the strands of the fabric. Thus none of the gelatin has been rendered insoluble and hence practically all of it has been washed away in the hot water bath. As a result there remains nothing but the open mesh of the fabric, as shown in Figs. 7 and 8, with relatively large openings $c$ of substantially the full size of the spaces between the bare strands.

It will therefore be understood that when a screen of this character is employed as a stencil for printing, the ink will pass through the openings $a$, $b$ or $c$ onto the printing surface, thus forming small, medium or large dots in accordance with the lights and shades of the picture, thereby giving the desired half-tone effect.

The weave or mesh of the fabric should not be too close or fine, but should be more or less open. I have found that from 50 to 80 lines per inch will produce good results, the exact number depending on the nature of the ink and on other conditions. The ink employed should of course be of such consistency that it will not blot or run from one opening to another, but will produce clear separate dots in at least all portions of the picture, except perhaps the deepest shadows.

As above stated, there are a number of possible materials that may be used for the strands or filaments from which the textile screen is woven. An exceptionally suitable material is, however, regenerated cellulose (rayon).

Methods for forming a silver halide light-sensitive compound in regenerated cellulose are known. One method consists in soaking the regenerated cellulose in a solution of silver nitrate in water and then treating the material in a suitable soluble halide such as potassium bromide. Silver bromide will be produced in the regenerated cellulose in a form quite similar to that in which it occurs in ordinary photographic emulsions.

Instead of regenerated cellulose, gelatin photographic emulsion spun into suitable filaments may be employed. Or, it is possible to use gelatin filaments and form the photographic emulsion within them after the textile fabric is woven. The production of silver halide systems in gelatin is well known. Also, methods for producing silver halide systems in cellulose nitrate are fairly well known and cellulose nitrate may therefore be also employed.

Another alternative form of material which can be employed is a thin, but highly concentrated photographic emulsion containing silver salts coated onto the screen fabric after it is woven, care being taken that the coating does not plug or block the mesh or openings in the fabric to any appreciable extent. In this case, filaments of non-absorbent material such as glass, or metal, may be employed. After this emulsion is hardened, the screen may be impregnated with the soluble gelation, as above described.

Still another possible form of material would be filaments having a core consisting of fibers, such as silk or nylon, or even strands of glass or metal, over which is coated a layer of gelatin in which a photographic emulsion is formed. Such photographic emulsion can be formed in the gelatin either before or after the filaments are woven into a fabric.

Where, in the appended claims, I use the expression "woven textile fabric" I intend it to mean a fabric woven from any of the types of strands or filaments mentioned in the preceding paragraphs.

While I have described the use of gelatin in carrying out the invention, other colloidal material such, for example, as gum arabic, glue, or agar-agar may be employed. I intend to include all of these colloids by the term "gelatinous material."

The fabric sheets above described, incorporating light-sensitive silver salts, and impregnated with soluble gelatinous material, as shown in Fig. 1, may then be sold by photographic supply houses as an article of commerce, the same as films or sensitized paper, to commercial photographers or printing establishments desiring to make half-tone stencil screens therefrom, in accordance with the invention.

The following specific example of one exact method of carrying out the invention is given, assuming that the silver halide used is bromide, as above described.

Having formed the light-sensitive silver halide system in the filaments of the woven textile material, in a relatively sensitive yet stable form, the fabric is impregnated with gelatin. This gelatin is made up in a solution of approximately 10% in water, and preservatives against bacterial decomposition are preferably added. The fabric is then passed through this heated solution. The gelatin selected should be of the so-called medium hard or hard variety so that it will withstand the various solutions at temperatures around 25° C. without undue swelling or reticulation, or without becoming too delicate to handle readily. After the gelatin is set, it is allowed to dry, in accordance with the usual photographic practices. The sheet is then ready for use.

The sheet, prepared as above, is then exposed to light under a diapositive of the picture to be reproduced, either by contact or by projection, or in a camera. The exposing procedure is similar to that of working with ordinary photographic printing papers.

The development is carried out in a manner similar to the development of an ordinary photographic print. A suitable developing solution is as follows:

| | | |
|---|---|---|
| Metol (p-methylaminophenol sulfate) | gms | 1.5 |
| Sodium sulfite | gms | 45.0 |
| Hydroquinone | gms | 3.0 |
| Sodium carbonate | gms | 6.0 |
| Potassium bromide | gms | 0.8 |
| Water | liter | 1.0 |

If the material has been properly prepared and correctly exposed and developed, the result should look exactly like a correctly exposed and developed paper print.

After washing the developed sheet for about five minutes in running water, and drying the same, it is treated in a special hardening and bleaching solution, such, for example, as the following:

| | | |
|---|---|---|
| Potassium bromide | gms | 3 |
| Potassium ferricyanide | gms | 3 |
| Potassium dichromate | gms | 3 |
| Chromic acid | gms | 1 |
| Chrome alum | gms | 2 |
| Water | ml | 300 |

This solution penetrates the gelatin rapidly and comes into contact with the silver compound in the image formed within the filaments of the regenerated cellulose or other textile material. One of the products of the resulting bleaching reaction has the property of hardening gelatin. Obviously, the amount of this product formed in the strands or filaments is directly proportional to the amount of silver present, and therefore is proportional to the density of the image. Hence, as above described, the thickness of the layer of gelatin surrounding each strand which is hardened depends on the relative density of the silver image in the fabric at each point.

After the bleaching and hardening operation is completed the screen is washed in hot water. Water at a temperature of approximately 50° C. is about right, but this will vary somewhat depending on the exact character of the gelatin used. Also, as the screen material gets older it will be necessary to use a somewhat higher temperature.

As above explained, the effect of this hot water is to wash away the soluble portions of the gelatin, while the portions which have been rendered insoluble by the hardening treatment remain on the strands of the fabric, with the result that openings of smaller or larger size are formed through the sheet between the coated strands, as above described.

In order to secure additional hardening of the gelatin so as to increase the useful life of the screen, it may be treated in a bath of 1% formalin made alkaline with 1% of sodium carbonate. After this, the screen must be washed again for five minutes in running water and may then be dried. Infra-red heat lamps may be used to secure rapid and satisfactory drying.

It will, of course, be understood that other known and suitable developers, instead of that above given, may be used if desired. It is also obvious that other hardening and bleaching mixtures may be employed, since the properties of the dichromates and other agents for this purpose are well known in the photographic art.

An example of a suitable alternate developing solution is as follows:

| | | |
|---|---|---|
| Amidol (2, 4 diaminophenol dihydrochloride) | gms | 5.2 |
| Sodium sulfite | gms | 32.0 |
| Potassium bromide | gms | 0.1 |
| Water | liter | 1.0 |

An alternate bleach and hardening process may be used as follows:

The developed, washed and dried sheet is treated in a 2% solution of potassium ferricyanide until the visible image is bleached. The sheet is then placed in a second solution of the following composition:

| | | |
|---|---|---|
| Potassium bichromate | gms | 3.0 |
| Potassium bromide | gms | 5.0 |
| Boric acid | gms | 3.0 |
| Borax | gms | 3.0 |
| Water | ml | 300.0 |

The condition of the sheet is now exactly similar to a sheet treated in the single solution bleach and hardening solution already described.

If, instead of using a diapositive, it is desired to make a stencil screen from a photographic negative, the procedure is slightly different.

In this case, after exposure and development and washing to remove the resulting products, the screen is bleached in a reversal type bleaching solution that removes the silver that resulted from the development but leaves, virtually unaffected, the silver salts that were not acted on by the developer.

An example of a suitable bleaching solution that may be used is as follows:

| | | |
|---|---|---|
| Water | liter | 1.0 |
| Potassium permanganate | gms | 3.0 |
| Sulfuric acid, sp. gr. 1.87 | ml | 10.0 |

After treatment in this bath, the screen is washed to remove the bleach reaction products.

The remaining silver salts are then fogged so that they become developable, such fogging being done either by means of light or by means of suitable known chemical of physical fogging agents. This residual fogged silver salt is then further developed to yield a deposit of colloidal silver and the screen is further washed to remove the products of this second development.

The screen is then subject to the action of a special bleach and hardening solution as before and is treated with hot water, as above described, to remove all of the soluble gelatin but to leave unaffected the gelatin rendered insoluble by the bleaching and hardening treatment.

What I claim is:

1. As an article of manufacture, a photographic stencil screen comprising an open mesh woven textile fabric, in at least the outer portion of the strands of which is incorporated a light-sensitive silver salt which does not appreciably close the mesh openings between the strands, said fabric being impregnated with soluble gelatinous material free from silver salts, which gelatinous material overlies and surrounds the said silver salt and fills the said mesh openings.

2. As an article of manufacture, a photographic stencil screen comprising an open mesh woven fabric the strands of which are coated with an emulsion containing a light sensitive silver salt in such a manner that said coating does not appreciably close the mesh openings between the strands, said fabric being impregnated with soluble gelatinous material free from silver salts, which gelatinous material completely fills the mesh openings of the fabric.

3. In the production of a photographic stencil screen, the steps which comprise forming a suitable woven fabric of relatively open mesh, coating said fabric with a photographic emulsion containing a light-sensitive silver salt in such manner that the coating does not appreciably close the mesh openings between the strands, and then impregnating the fabric with soluble gelatinous material free from silver salts, in such manner that the gelatinous material fills said mesh openings.

4. In the production of a photographic stencil screen, the steps which comprise forming suitable filaments, coating each filament with a layer of material incorporating a phototgraphic emulsion containing a light-sensitive silver salt, allowing the emulsion to harden, weaving such coated filaments into a relatively open mesh fabric, and impregnating such fabric with soluble gelatinous material free from silver salts, in such manner that the gelatinous material completely fills the mesh openings between the filaments.

References Cited in the file of this patent

UNITED STATES PATENTS

| Number | Name | Date |
|---|---|---|
| 196,510 | Winter | Oct. 23, 1877 |
| 532,173 | Martin | Jan. 8, 1895 |
| 645,952 | Harvey | Mar. 27, 1900 |
| 1,997,745 | Renker | Apr. 16, 1935 |

FOREIGN PATENTS

| Number | Country | Date |
|---|---|---|
| 11,912 | Great Britain | of 1902 |
| 11,219 | Great Britain | of 1903 |
| 424,976 | Great Britain | Mar. 6, 1935 |
| 446,653 | Great Britain | Publ. 1936 |
| 497,024 | Great Britain | Dec. 12, 1938 |
| 584,530 | France | Feb. 9, 1925 |